United States Patent Office 2,914,436
Patented Nov. 24, 1959

2,914,436

COMPOSITE PLASTIC ARTICLE WITH A CELLULOSE ACETATE COMPONENT

Felix G. Nakielny, South River, N.J., assignor to Hercules Powder Company, Wilmington, Del., a corporation of Delaware No Drawing. Application November 2, 1955
Serial No. 544,590

6 Claims. (Cl. 154—43)

This invention relates to shaped plastic structures having in combination two shaped plastics in contact with each other. More particularly, this invention relates to shaped plastic structures wherein a shaped polystyrene or acrylic polymer plastic is in contact with a shaped plasticized cellulose acetate plastic.

Numerous plastic articles are being manufactured wherein part of the structure is made of one plastic and other parts are made of an entirely different plastic, the different parts being in contact with each other in the assembled structure. For example, the main body of radio cabinets or clock casings may be made of one plastic for strength while the dial covers, etc., may be made of a clear glasslike plastic such as polystyrene or an acrylic polymer for visibility. Another typical example is plastic fountain pen barrels having a small window made of polystyrene or acrylic polymer for observing the level of ink in the pen. While it would be highly desirable for economic reasons to make the pen barrel out of cellulose acetate plastic, heretofore customary cellulose acetate plastics have been unsuitable for such application for two reasons. In the first place, the customary cellulose acetate plastics commonly employed for making numerous plastic articles, when brought into contact with a shaped polystyrene or acrylic polymer plastic part, causes the polystyrene or acrylic polymer plastic part to craze, thus greatly detracting from its glasslike clarity. In the second place, customary cellulose acetate plastics have lacked sufficient dimensional stability for such uses. Crazing of polystyrene or acrylic polymer parts in contact with cellulose acetate plastic parts has been particularly annoying and troublesome because there is no means known for predicting how to formulate the cellulose acetate plastic to overcome such crazing.

Now in accordance with this invention, it is possible to assemble shaped polystyrene or acrylic polymer parts and shaped cellulose acetate plastic parts in contact with each other in the same shaped structure having desirable dimensional stability and without encountering crazing of the polystyrene or acrylic polymer parts. According to this invention, shaped plastic structures comprise in combination a first shaped plastic and a second shaped plastic in contact with each other in said shaped plastic structures, said first shaped plastic being selected from the group consisting of polystyrene, polyalkyl acrylate esters and polyalkyl methacrylate esters, and said second shaped plastic comprising cellulose acetate having an acetyl value of at least about 57% and an intrinsic viscosity of at least about 1.6 and from about 15% to about 40% by weight, based on said cellulose acetate, of a plasticizer selected from the group consisting of butyl benzyl phthalate, ethylene glycol dibenzoate, diethylene glycol dibenzoate, triethylene glycol dibenzoate, propylene glycol dibenzoate, dipropylene glycol dibenzoate, and mixtures thereof, said second shaped plastic being free of any tendency to cause crazing of said first shaped plastic in contact therewith.

Although it is not intended that the invention shall be limited to any particular theory of operation, it appears that the combination of high acetyl cellulose acetate flake of high intrinsic viscosity and specific plasticizer is responsible for the improved results obtained. It is believed that high acetyl cellulose acetate flake contributes to improved dimensional stability and permanence properties because of its low water sensitivity. It is also believed that the longer chain length reflected by high intrinsic viscosity contributes to toughness of the plastic. Choice of cellulose acetate plasticizers appears to be a critical factor in overcoming crazing of polystyrene or acrylic polymer plastics in contact with cellulose acetate plastic.

The following examples are presented herein for the purpose of illustration but it will, of course, be understood that the invention is susceptible to different modified embodiments which come within the scope of the appended claims. The parts given are by weight.

EXAMPLE I

Cellulose acetate plastic compositions in accordance with this invention were prepared by the following customary hot extrusion compounding method.

High acetyl cellulose acetate flake having a combined acetic acid content of 58.4% and an intrinsic viscosity of 1.7–1.8 was preliminarily mixed with the plasticizer at room temperature, and the resulting premix was dried about 16 hours at 160° F. An acid-accepting stabilizer consisting of a polymeric condensation product of epichlorohydrin and bisphenol (Epon RN–34, Shell Chemical Company), in an amount equal to 0.2 part per 100 parts of cellulose acetate flake was dissolved in the plasticizer and used in all formulations. The dried premix was then introduced into a hot screw extruder heated to a temperature sufficient to cause intimate fusion of the cellulose acetate flake and plasticizer and blend the fused mass into a uniform composition. Temperatures within the extruder were in the range of 430° F. and 600° F., depending upon the plasticizer employed. The fused mass was extruded in the form of strands which, after cooling, were chopped into uniform sized molding powder pellets.

Pieces of molded glass-clear transparent polystyrene plastic and similar pieces of molded acrylic polymer plastics were immersed in portions of the cellulose acetate molding powders, produced as set forth above, in suitable containers and exposed to 130° F. and 100% relative humidity for at least 48 hours. After this time, visual observations of the polystyrene and acrylic polymer molded pieces were made for crazing. Absence of crazing in this test indicated the cellulose acetate plastic composition to be completely satisfactory for use in molded structures in contact with shaped parts made of polystyrene and acrylic polymer plastics without any tendency to craze these plastics.

The following table lists some examples of high acetyl cellulose acetate plastic compositions in accordance with this invention together with crazing results in accordance with the above crazing test:

*Table.—Examples of high acetyl cellulose acetate plastic compositions which do not craze polystyrene or acrylic polymer plastics*

|  | Composition No. | | | |
| --- | --- | --- | --- | --- |
|  | 1 | 2 | 3 | 4 |
| Cellulose Acetate, 58.4% Combined Acetic Acid, 1.7–1.8 Intrinsic Viscosity. | 100 | 100 | 100 | 100. |
| Epon RN-34 | 0.2 | 0.2 | 0.2 | 0.2. |
| Diethylene Glycol Dibenzoate | 25 | 31 |  |  |
| Butyl Benzyl Phthalate |  |  | 25 | 31. |
| Crazing Observations [1]: |  |  |  |  |
| Acrylic Plastics | No Crazing. | No Crazing. | No Crazing. | No Crazing. |
| Polystyrene Plastics | do | do | do | Do. |

[1] After 48 hours at 130° F. and 100% relative humidity in accordance with crazing test set forth hereinbefore.

Cellulose acetate plastics formulated with the same high acetyl cellulose acetate employed in Formulas 1, 2, 3 and 4 in the preceding table with customary cellulose acetate plasticizers including dimethyl phthalate, diethyl phthalate, di-n-propyl phthalate, dibutyl phthalate, diisobutyl phthalate, methyl phthalyl ethyl glycolate, mixtures of dimethyl and diethyl phthalates, and mixtures of dimethyl phthalate, diethyl phthalate and triphenyl phosphate in amounts corresponding to the plasticizer contents in Formulas 1, 2, 3 and 4 in the preceding table, all caused crazing of polystyrene and acrylic plastics when tested in the manner set forth above.

EXAMPLE II

High acetyl cellulose acetate plastics, if formulated and tested for crazing in accordance with Example I, employing ethylene glycol dibenzoate, triethylene glycol dibenzoate, propylene glycol dibenzoate, dipropylene glycol dibenzoate, and various mixtures of these and with butyl benzyl phthalate and diethylene glycol dibenzoate as plasticizers, are all free of any tendency to cause crazing of polystyrene or acrylic polmer plastics in contact therewith.

This invention is specific to a molded plastic structure wherein part of said structure is shaped polystyrene or acrylic polymer plastic in contact with another part of said structure comprising a shaped high acetyl cellulose acetate plastic made with cellulose acetate having at least about 57% combined acetic acid content and an intrinsic viscosity of at least about 1.6, and plasticized with certain specific plasticizers, as set forth hereinafter. As pointed out above, part of the plastic structure may be either a shaped polystyrene plastic or a shaped acrylic polymer plastic. Acrylic polymers in accordance with this invention are polyalkyl acrylate esters such as polymethyl acrylate, polyethyl acrylate, polypropyl acrylate, polyisopropyl acrylate, polybutyl, polyisobutyl acrylate, and the like, and polyalkyl methacrylate esters such as polymethyl methacrylate, polyethyl methacrylate, polypropyl methacrylate, polyisopropyl methacrylate, polybutyl methacrylate, polyisobutyl methacrylate, and the like. All of the acrylic polymers in accordance with this invention are thermoplastic by nature and are characterized by being transparent and glass-clear when shaped into plastic parts such as dials and dial covers, windows, indicia, etc.

Another part of the plastic structure in accordance with this invention, usually the main body of structures such as pen barrels, typewriter keys, radio cabinets, and the like, is a shaped high acetyl cellulose acetate plastic having specific requirements with respect to the acetyl value and intrinsic viscosity of the cellulose acetate employed. In this respect, the cellulose acetate flake used should have an acetyl value of at least about 57% determined as combined acetic acid content, and preferably between 58% and 60% combined acetic acid content, and should have an intrinsic viscosity of at least 1.6, and preferably between 1.7 and 1.9. However, the broad aspect of the invention includes an acetyl value from about 57% to the theoretical value of fully acetylated or primary cellulose acetate (cellulose triacetate), i.e., 62.5% combined acetic acid content, and an intrinsic viscosity of from about 1.6 to 2.0. These values for acetyl content and intrinsic viscosity are important in order to achieve satisfactory strength and dimensional stability in the shaped cellulose acetate part.

The cellulose acetate of high acetyl value may be made in any suitable manner and the acylation reaction therefore may be catalyzed by combining or noncombining catalysts. Since sulfuric acid is the catalyst of choice in commercial practice and chemically bound sulfates tend to remain in the cellulose ester thus produced, a stabilizer such as that set forth in the examples is used. In general, any nonvolatile epoxy-type compound compatible with the plastic composition can be employed to stabilize the cellulose acetate composition. The epoxy-type compounds resulting from the condensation of an epihalohydrin and a polyhydric phenol are sufficiently high boiling and nonvolatile to render them suitable at the compounding or molding temperature of the plastic composition and are, therefore, preferred. However, other stabilizers may be used such as the organic polyglycidyl compounds prepared by the polymerization or condensation of glycidol. Ordinarily, the stabilizer will be present in amount from about 0.01 to 0.5 part by weight per 100 parts of cellulose acetate, the amount depending upon the amount of chemically bound sulfate remaining in the cellulose acetate. The high acetyl flake used in the preceding examples was prepared using sulfuric acid as the catalyst. The flake product contained significant quantities of combined sulfate which necessitated the use of a heat stabilizer to prevent degradation. When using sulfate-containing flake, a stabilizer must be used since the processing temperatures in accordance with this invention are considerably in excess of those normally used for cellulose derivatives plastics. However, the stabilizer may be omitted entirely where the acylation reaction is catalyzed by a noncombining catalyst, such as zinc chloride, perchloric acid or the like, or where the chemically bound sulfates are substantially removed to assure satisfactory stability.

Plasticizer selection in accordance with this invention is critical in formulating high acetyl cellulose acetate plastic compositions which are free of any tendency to craze polystyrene or acrylic plastics in contact therewith. Suitable plasticizers include butyl benzyl phthalate, ethylene glycol dibenzoate, diethylene glycol dibenzoate, triethylene glycol dibenzoate, propylene glycol dibenzoate, dipropylene glycol dibenzoate, and mixtures thereof. Suitable high acetyl cellulose acetate compositions for the purposes of this invention will contain from about 15% to about 40% by weight, based on the cellulose acetate, of plasticizer, and preferably from about 23% to about 33% by weight of plasticizer.

It will be understood, of course, that the high acetyl cellulose acetate compositions of this invention may contain the customary fillers, colorants, etc., without departing from the substance or scope of the invention.

This invention is useful in all plastic structures wherein shaped plastic parts of polystyrene or an acrylic polymer is assembled in contact with shaped parts of cellulose acetate plastic in the finished article. Typical applications where the advantages of this invention particularly apply include shaped bodies such as fountain pen barrels, radio cabinets, clock casings, typewriter keys, instrument casings, flash light casings, and numerous household articles, wherein the main body of the article is fabricated of high acetyl cellulose acetate plastic for durability, strength, and dimensional stability, and indicia, dials, dial covers, knobs, sight windows, etc., are fabricated of polystyrene or acrylic plastics because of their glasslike clarity.

What I claim and desire to protect by Letters Patent is:

1. As a new article of manufacture, a shaped plastic structure comprising in combination a first shaped plastic and a second shaped plastic in contact with each other in said shaped plastic structure, said first shaped plastic being selected from the group consisting of polystyrene, polymethyl acrylate, polyethyl acrylate, polypropyl acrylate, polyisopropyl acrylate, polybutyl acrylate, polyisobutyl acrylate, polymethyl methacrylate, polyethyl methacrylate, polypropyl methacrylate, polyisopropyl methacrylate, polybutyl methacrylate and polyisobutyl methacrylate, and said second shaped plastic consisting essentially of cellulose acetate having an acetyl value of from about 57% to 62.5% combined acetic acid content and an intrinsic viscosity of from about 1.6 to 2 and from about 15% to about 40% by weight, based on said cellulose acetate of a plasticizer selected from the group consisting of butyl benzyl phthalate, ethylene glycol dibenzoate, diethylene glycol dibenzoate, triethylene glycol dibenzoate, propylene glycol dibenzoate and dipropylene glycol dibenzoate, and mixtures thereof, said second shaped plastic being free of any tendency to cause crazing of said first shaped plastic.

2. As a new article of manufacture, a shaped plastic structure in accordance with claim 1 wherein said first shaped plastic is polystyrene.

3. As a new article of manufacture, a shaped plastic structure in accordance with claim 1 wherein said first shaped plastic is polymethyl acrylate ester.

4. As a new article of manufacture, a shaped plastic structure in accordance with claim 1 wherein said first shaped plastic is polymethyl methacrylate ester.

5. As a new article of manufacture, a shaped plastic structure in accordance with claim 1 wherein the plasticizer in said second shaped plastic comprising cellulose acetate is diethylene glycol dibenzoate.

6. As a new article of manufacture, a shaped plastic structure in accordance with claim 1 wherein the plasticizer in said second shaped plastic comprising cellulose acetate is butyl benzyl phthalate.

References Cited in the file of this patent
UNITED STATES PATENTS

| | | |
|---|---|---|
| 2,157,167 | Dreyfus | May 9, 1939 |
| 2,203,748 | Seymour et al. | June 11, 1940 |
| 2,258,991 | McNally | Oct. 14, 1941 |
| 2,280,097 | Moss | Apr. 21, 1942 |
| 2,305,658 | Andersen et al. | Dec. 22, 1942 |
| 2,336,273 | Malm | Dec. 7, 1943 |
| 2,412,611 | Gloor | Dec. 17, 1946 |
| 2,454,274 | Daly et al. | Nov. 23, 1948 |
| 2,456,467 | Swedlow | Dec. 14, 1948 |
| 2,564,194 | Nie et al. | Aug. 14, 1951 |
| 2,604,423 | Slotterbeck et al. | July 22, 1952 |
| 2,805,170 | Bell | Sept. 3, 1957 |